(12) United States Patent
Asada et al.

(10) Patent No.: US 7,862,874 B2
(45) Date of Patent: Jan. 4, 2011

(54) WELDED RESIN MATERIAL

(75) Inventors: Shinsuke Asada, Tokyo (JP); Takafumi Hara, Tokyo (JP); Seizo Fujimoto, Tokyo (JP); Masaaki Taruya, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 8 days.

(21) Appl. No.: 11/867,979

(22) Filed: Oct. 5, 2007

(65) Prior Publication Data

US 2008/0254242 A1      Oct. 16, 2008

(30) Foreign Application Priority Data

Apr. 10, 2007   (JP) .............................. 2007-103068

(51) Int. Cl.
    *B32B 3/02*     (2006.01)
    *B29C 65/16*    (2006.01)
(52) U.S. Cl. ....................................................... 428/60
(58) Field of Classification Search ................... 428/60, 428/58; 156/272.8, 379.8; 403/270
    See application file for complete search history.

(56) References Cited

U.S. PATENT DOCUMENTS

| | | |
|---|---|---|
| 4,636,609 A | 1/1987 | Nakamata |
| 6,193,833 B1 * | 2/2001 | Gizowski et al. ......... 156/272.8 |
| 2004/0239007 A1 | 12/2004 | Arai et al. |

FOREIGN PATENT DOCUMENTS

| | | |
|---|---|---|
| DE | 101-09-595 A1 | 10/2001 |
| DE | 10-2004-023-224 A1 | 12/2004 |
| JP | 08-216259 A | 8/1996 |
| JP | 2002-283455 A | 10/2002 |
| JP | 2004-209916 A | 7/2004 |
| WO | 2005-056-263 A2 | 6/2005 |

\* cited by examiner

*Primary Examiner*—Alexander Thomas
(74) *Attorney, Agent, or Firm*—Sughrue Mion, PLLC

(57) ABSTRACT

A method for producing a welded resin material contains steps of: superimposing a resin member having transmissibility to laser light and a resin member having absorptivity to laser light to form a contact part where the resin members are in contact with each other; forming a closed space that is adjacent to the contact part and faces one end of the contact part; and radiating the laser light from the resin member having transmissibility while pressing the resin members to each other through the contact part, so as to heat the contact part to melt a resin at the contact part, housing a resin excluded from the contact part through melting in the closed space, solidifying the resin melted at the contact part to weld the resin members.

3 Claims, 4 Drawing Sheets

WELDED RESIN MATERIAL

BACKGROUND OF THE INVENTION

1. Field of the Invention

The present invention relates to a method for producing a welded resin material by joining a resin member having transmissibility to laser light and a resin member having absorptivity to laser light, and to a welded resin material.

2. Description of the Related Art

Such a method has been well known in the art that a resin member having transmissibility to laser light having a specific wavelength and a resin part having absorptivity to laser light having the same wavelength are superimposed and irradiated with laser light from the side of the transmissive resin member to weld them. The principle of the method will be described briefly. Laser light passes through the transmissive resin with substantially no absorption and is absorbed in the vicinity of the surface of the absorptive resin member. The energy of the laser light thus absorbed is converted to heat, which heats the surface of the absorptive resin member. The vicinity of the surface of the transmissive resin member, which is in contact with the surface of the absorptive resin member, is also heated through heat transfer. As a result, a molten layer is formed at a part where the transmissive resin member and the absorptive resin member are in contact with each other, and the molten layer is solidified to weld the resin members.

As apparent from the principle, the contact property between the transmissive resin member and the absorptive resin member is important upon welding. In the case where the contact is insufficient, heat transfer from the absorptive resin member to the transmissive resin member become insufficient to cause failure in joining. In order to ensure the surface contact property between the transmissive resin member and the absorptive resin member, in general, the resin members are in contact with each other under pressure at the contact part and irradiated with laser beam.

The molten layer formed at the contact part is applied with the contact pressure upon welding as described above, and therefore, a part of the molten resin is excluded outside the contact part. The molten excluded resin grows in a strip or brush form associated with progress of melting if no particular measure is instituted, and is liable to be solidified in an incisive shape after melting.

The excluded resin solidified in the incisive shape is liable to be dropped off upon application of vibration or impact, and causes a problem in contamination of environments, in which the product having the molten part is used or transported. In the case of a product having an internal space having a precision component, such as an electronic part, housed therein, there is a problem of damaging the precision part due to impact of the excluded resin dropped in the internal space. Furthermore, even though the excluded resin is not dropped off, the incisive part exposed externally disfigures the product.

Under the circumstances, the method disclosed in JP-A-2004-358697 as the first method for producing a welded resin material includes the steps of superimposing a resin member having transmissibility to laser light and a resin member having absorptivity to laser light to form a closed space at the contact interface between the resin members, and radiating laser light through the closed space from the resin member having transmissibility to laser light to fill the closed space with a molten material obtained by melting the surrounding resin, whereby the resin members are welded. In order to fill the closed space with the molten material for welding, however, welding and sealing cannot be attained unless the closed space is filled with the molten material. Accordingly, a large quantity of energy of laser light and a prolonged welding time are required, and there is a possibility of destabilizing the welding property. Furthermore, the density of the surrounding resin is decreased to deteriorate the durability when the surrounding resin of the closed space is melted excessively.

In the method as the second method for producing a welded resin material, there is an attempt to reduce the amount of the excluded resin formed. That is, the energy of laser light radiated onto the contact part is restricted to melt only the surface layers of the transmissive resin members and the absorptive resin members for welding. In this method, the amount of the formed excluded resin can be reduced, but there is a risk of failure on joining when only a slight gap is formed at the contact part. Accordingly, the contact surfaces of the resin members are necessary to have high planarity before welding, which often exceeds beyond the planarity that can be obtained by the ordinary resin molding techniques. Thus, there is a problem of deterioration in productivity when the excluded resin is suppressed from being formed.

SUMMARY OF THE INVENTION

The present invention has been developed for solving the aforementioned problems, and an object thereof is to provide such a method for producing a welded resin material, and a welded resin material, in that an excluded resin, even though it is formed, is prevented from being dropped off after laser welding.

The method for producing a welded resin material of the present invention, in one aspect, contains steps of: superimposing a resin member having transmissibility to laser light and a resin member having absorptivity to laser light to form a contact part where the resin members are in contact with each other; forming a closed space that is adjacent to the contact part and faces one end of the contact part; and radiating the laser light from the resin member having transmissibility while pressing the resin members to each other through the contact part, so as to heat the contact part to melt a resin at the contact part, housing a resin excluded from the contact part through melting in the closed space, solidifying the resin melted at the contact part to weld the resin members.

According to the method for producing a welded resin material of the present invention, the resin members are pressed to each other through the contact part, to which laser light is radiated from the resin member having transmissibility to heat the contact part for melting the resin at the contact part, the resin excluded from the contact part through melting is housed in the closed space, and the resin melted at the contact part is solidified to weld the resin members, whereby the welded part has excellent welding property, and the molten resin excluded from the contact part is prevented from being dropped off and contaminating the environment since it is housed in the closed space.

The method for producing a welded resin material of the present invention, in another aspect, contains steps of: superimposing a resin member having transmissibility to laser light and a resin member having absorptivity to laser light to form a contact part where the resin members are in contact with each other; radiating the laser light from the resin member having transmissibility while pressing the resin members to each other through the contact part, so as to heat the contact part to melt a resin at the contact part, solidifying the resin melted at the contact part to weld the resin members; and molding a resin excluded from the contact part through melting.

According to the method for producing a welded resin material of the present invention, the resin members are pressed to each other through the contact part, to which laser light is radiated from the resin member having transmissibility to heat the contact part for melting the resin at the contact part, the resin melted at the contact part is solidified to weld the resin members, and the resin excluded from the contact part through melting is molded, whereby the welded part has excellent welding property, and the molten resin excluded from the contact part is prevented from being dropped off and contaminating the environment since it is molded.

The welded resin material of the present invention, in one aspect, contains a resin member having transmissibility to laser light, a resin member having absorptivity to laser light, a joined part containing a contact part of the resin members superimposed to each other that has been welded with laser light, and a closed space that is adjacent to the contact part and faces one end of the contact part, the closed space having housed therein a resin excluded from the contact part melted and solidified.

According to the welded resin material of the present invention, the welded resin material contains a joined part containing a contact part of the resin members superimposed to each other that has been welded with laser light, and a closed space that is adjacent to the contact part and faces one end of the contact part, and the resin excluded from the contact part melted and solidified is housed in the closed space, whereby the molten resin excluded from the contact part is prevented from being dropped off and contaminating the environment since it is blocked within the closed space.

The welded resin material of the present invention, in another aspect, contains a resin member having transmissibility to laser light, a resin member having absorptivity to laser light, a joined part containing a contact part of the resin members superimposed to each other that has been welded with laser light, and a resin excluded from the contact part melted and solidified that has been molded.

According to the welded resin material of the present invention, the welded resin material contains a joined part containing a contact part of the resin members superimposed to each other that has been welded with laser light, and the resin excluded from the contact part melted and solidified that has been molded, whereby the molten resin excluded from the contact part is prevented from being dropped off and contaminating the environments.

The foregoing and other objects, features, aspects and advantages of the present invention will become more apparent from the following detailed description of the present invention when taken in conjunction with the accompanying drawings.

DETAILED DESCRIPTION OF THE INVENTION

Embodiment 1

Figure 1:
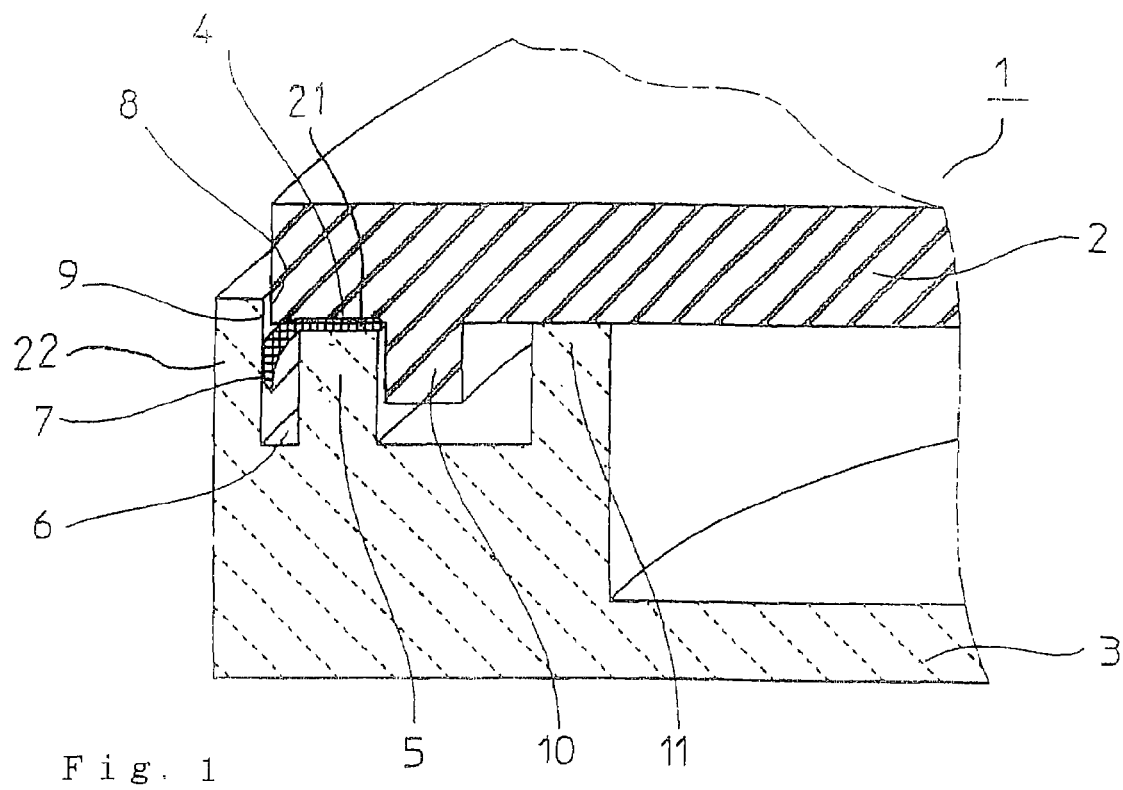
FIG. 1 is a partial cross sectional view showing an example of a welded resin material of an embodiment 1 of the present invention.

FIG. 1 is a partial cross sectional view showing an example of a welded resin material of an embodiment 1 of the present invention. The welded resin material will be described with reference to a sealed container 1 containing a cylindrical chassis with a bottom and a lid body as an example. The lid body 2 of the sealed container 1 is a resin member having transmissibility to laser light, and the cylindrical chassis with a bottom 3 is a resin member having absorptivity to laser light. A contact part 21 formed by making the resin members in contact with each other is welded to form a joined part 4. The joined part 4 is present between a top end of an annular rib (second annular projection) 5 provided on the chassis 3 and the lid body 2. The joined part 4 has been once melted by heating with laser light and then solidified upon welding. The rib 5 is provided in an annular form along the inner side of the outer periphery of the chassis 3, and a closed space 6 is provided on the outer circumference of the rib 5 through interdigitation of the lid body 2 and a first annular projection 22 on the outermost periphery of the chassis 3.

The closed space 6 faces one end of the contact part 21 of the resin members and is adjacent to the contact part 21. The closed space 6 is formed in an annular form along the outer circumference of the rib 5 and houses a resin 7 excluded from the contact part 21 and solidified upon welding. In other words, the closed space 6 has one end of the joined part 4 as a part of the inner wall thereof, is formed in an annular form along the outer circumference of the rib 5, and houses the resin 7 excluded from the contact part 21 and solidified upon welding.

Figure 7:
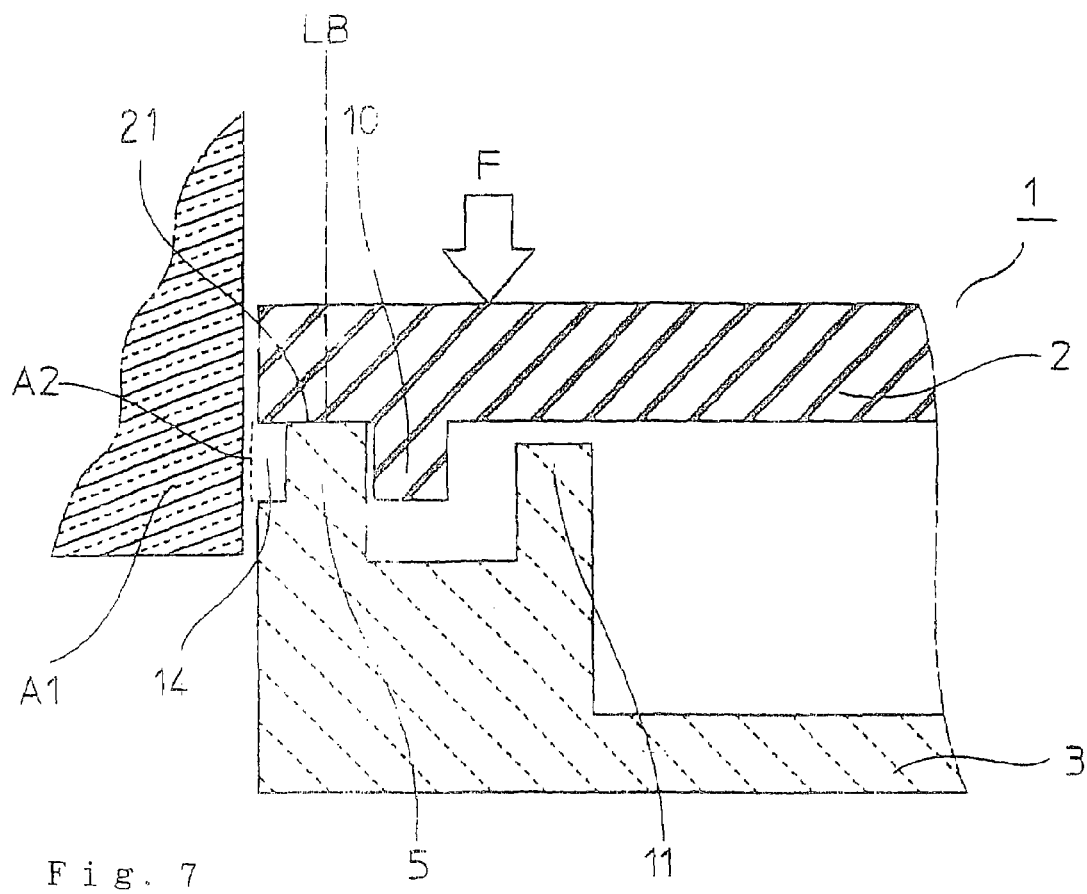
FIG. 7 is a partial cross sectional view showing an example of a method for producing a welded resin material of the embodiment 2.

The molten resin is excluded since a part of the molten layer is extruded upon welding the lid body 2 and the chassis 3 pressed to each other under pressure through the contact part 21. The inner circumference of the rib 5 (i.e., the side of the contact part 21 opposite to the closed space) is interdigitated with an annular projection (fourth annular projection) 10 provided on the lid body 2 to prevent the resin from being excluded to the inner side of the rib 5. Numeral 11 denotes a third annular projection provided on the innermost periphery of the chassis 3, and is formed to have a slightly lower height than the second annular projection 5 before welding as shown in FIG. 7.

The closed space 6 may not be a completely sealed space. The closed space 6 is formed through interdigitation of the lid body 2 and the first annular projection 22 of the chassis 3 as having been described, and the degree of sealing thereof is increased when an interdigitation part 8 provided on the lid body 2 and an interdigitation part 9 provided on the chassis 3 are press-fit, so as to enhance the effect of preventing the excluded resin 7 from being dropped outside the closed space 6. However, even in the case where the interdigitation is effected with a gap, and a slight gap is formed between the interdigitation part 8 of the lid body 2 and the interdigitation part 9 of the chassis 3, the effect of preventing the excluded resin 7 from being dropped off can be sufficiently exerted. In the case where the interdigitation is effected with a gap, there are such advantages that the lid body 2 and the chassis 3 can be easily fabricated, and the force for pressing can be sufficiently transmitted to the contact part 21 owing to the absence of resistance upon press fitting.

The method for producing the welded resin material shown in FIG. 1 will be described. In FIG. 1, the lid body 2 formed of a resin having transmissibility to laser light and the second annular projection 5 of the chassis 3 formed of a resin having absorptivity to laser light are superimposed to form the contact part 21 where they are in contact with each other. The lid body 2 and the chassis 3 are pressed to each other through the contact part 21, and the contact part 21 is heated by radiating laser light from the lid body 2 formed of the resin having transmissibility to melt the resin at the contact part 21. The resin excluded from the contact part 21 upon melting is housed in the closed space 6, and then the resin melted at the contact part 21 is solidified to weld the lid body 2 and the chassis 3, during which the molten resin having been housed in the closed space 6 is also solidified.

Since the superimposed contact part is welded to produce a welded resin material, the welding operation can be effected with local heating, excellent welding property can be obtained, excellent energy efficiency can be obtained, and the welding operation can be completed in a short period of time. The molten resin excluded from the contact part is blocked within the closed space, whereby the excluded resin can be prevented from being dropped off and contaminating the environments, and the product is prevented from being disfigured.

Figure 2:
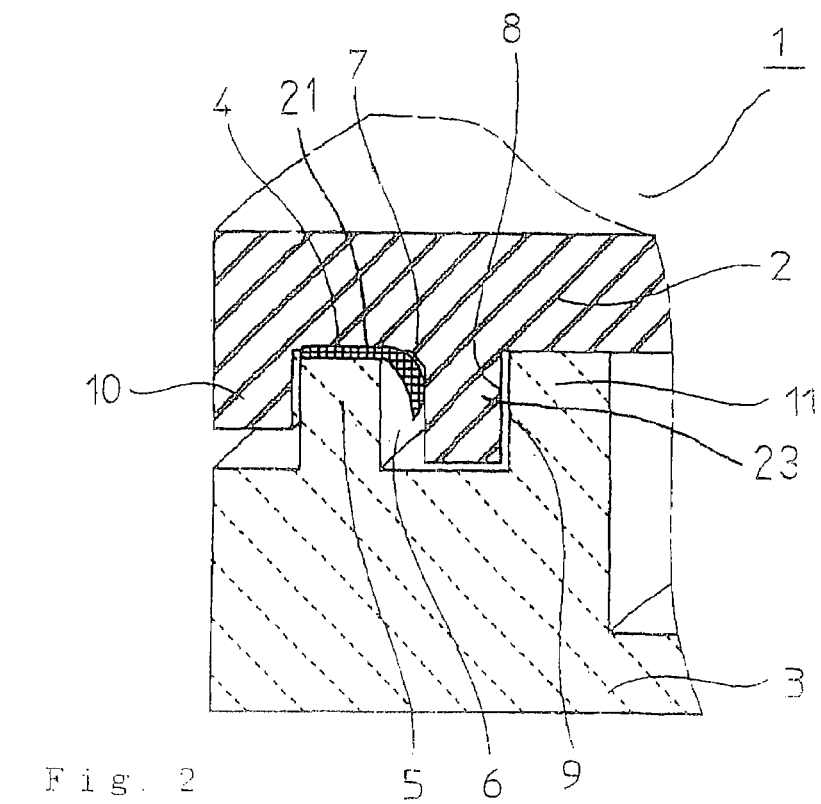
FIG. 2 is a partial cross sectional view showing another example of a welded resin material of the embodiment 1.

While the closed space 6 is provided on the outer circumference of the rib 5 in the example shown in FIG. 1, the closed space 6 may be provided on the inner circumference of the rib 5 as shown in FIG. 2. In the figures, the same symbols show the same or corresponding parts. In FIG. 2, the closed space 6 is provided to face one end of the contact part 21 (inner circumference of the rib 5) and is adjacent to the contact part 21. In FIG. 2, numeral 23 denotes a fifth annular projection formed on the lid body 2 and is interdigitated with the third annular projection 11 of the chassis 3 to form the closed space 6. The annular projection (fourth annular projection) 10 of the lid body 2 is interdigitated with the outer circumference (i.e., the side of the contact part 21 opposite to the closed space) of the rib 5 to prevent the molten resin from being excluded to the outer side.

Figure 3:
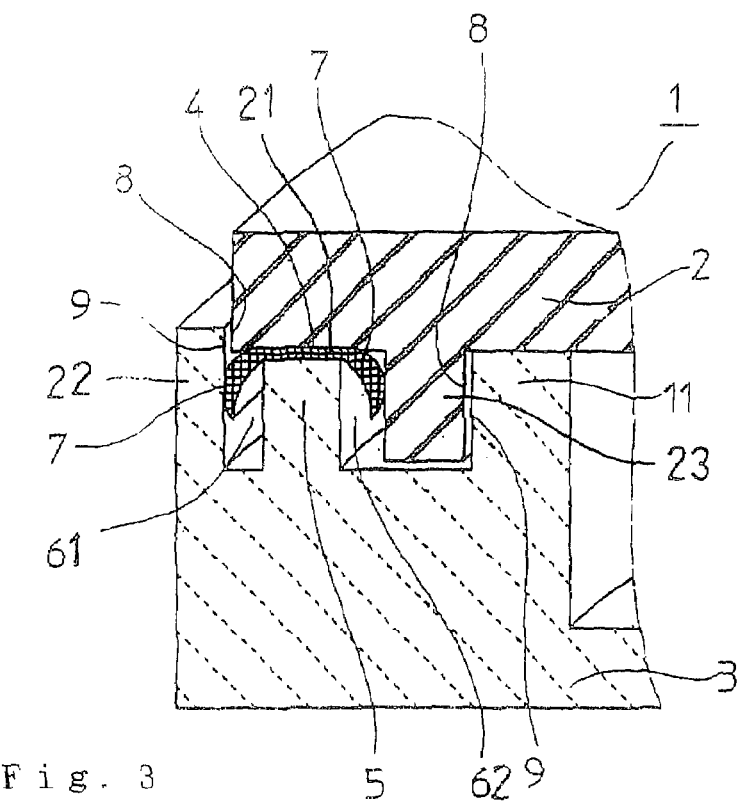
FIG. 3 is a partial cross sectional view showing still another example of a welded resin material of the embodiment 1.

Furthermore, as shown in FIG. 3, closed spaces 61 and 62 may be provided on both the inner circumference of the rib 5 (i.e., one side of the contact part 21) and the outer circumference of the rib 5 (i.e., the other side of the contact part 21).

The sealed container 1 referred in the embodiment is only an example of the welded resin material of the present invention. The joined part 4 may not be in an annular form and may be selected from a linear form, a spot form and the like depending on necessity. The shape of the closed space 6 may be arbitrarily selected depending on the shape of the joined part 4 (or the contact part 21). It is necessary herein that one end of the contact part 21 or an end of the joined part 4 is exposed as an inner wall of the closed space 6.

The material of the transmissive resin is not particularly specified as far as it has transmissibility to laser light used (for example, a transmittance of 25% or more), and examples thereof include polybutylene terephthalate (PBT), polyethylene terephthalate (PET), polyphenylene sulfide (PPS), polyether ether ketone (PEEK), polycarbonate (PC), polyamide (PA) and polyethylene (PE). Materials colored with a dye or a pigment may be used unless the transmissibility to the wavelength of the laser light is impaired.

The material of the absorptive resin is not particularly specified as far as it has absorptivity to laser light used (for example, a transmittance of 5% or less), and examples thereof include the similar resin materials as the transmissive resin, provided that a material having a low transmittance than the transmissive resin material is selected, or in the case where the same material is used, carbon black, a pigment or a dye capable of increasing absorptivity is mixed therein. The resin members may be molded by various molding methods, such as an injection molding method, an extrusion molding method, a blow molding method and a heat molding method, and may have a metallic member or another resin member inserted and molded therewith. It is sufficient that the resin members are formed of the combination of the transmissive resin and the absorptive resin only in the part that participates the welding operation.

The laser light used for welding the resin members to produce the welded resin material is not particularly specified. The laser light source is preferably a diode laser and a YAG laser having a wavelength in the infrared region exhibiting transmissibility to various resin materials, and a $CO_2$ laser and the like may also be selected. The radiation method of the laser beam is not particularly specified as far as the laser beam is radiated through the transmissive resin, and examples thereof include a method of scanning the contact part 21 with a laser beam focused to a spot form, and a method of irradiating the contact part 21 at one time with a laser beam having been shaped with an optical device or a mask according to the contact part 21.

Embodiment 2

Figure 4:
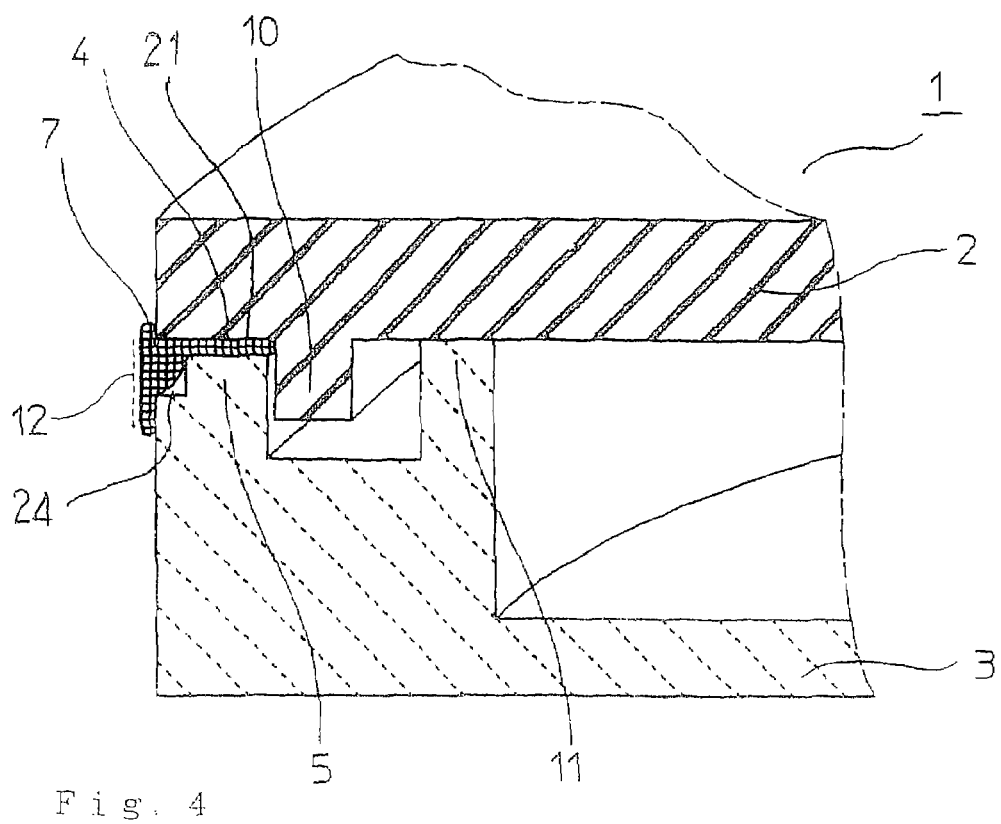
FIG. 4 is a partial cross sectional view showing an example of a welded resin material of an embodiment 2 of the present invention.

FIG. 4 is a partial cross sectional view showing an example of a welded resin material of the embodiment 2. The difference from the embodiment 1 is that it has no closed space for housing the resin excluded from the contact part 21. Since the fourth annular projection 10 provided on the lid body 2 is interdigitated on the inner circumference of the rib (second annular projection) 5, the resin 7 excluded from the contact part 21 is protruded outside the rib 5 and exposed to the outer circumference of the chassis 3 due to the absence of a closed space. The exposed surface of the excluded resin 7 is wholly or partially molded into a prescribed shape. In FIG. 4, numeral 24 denotes a reservoir for the excluded resin 7 provided in the chassis 3 as facing an end on the outer circumference of the contact part 21.

Figure 5:
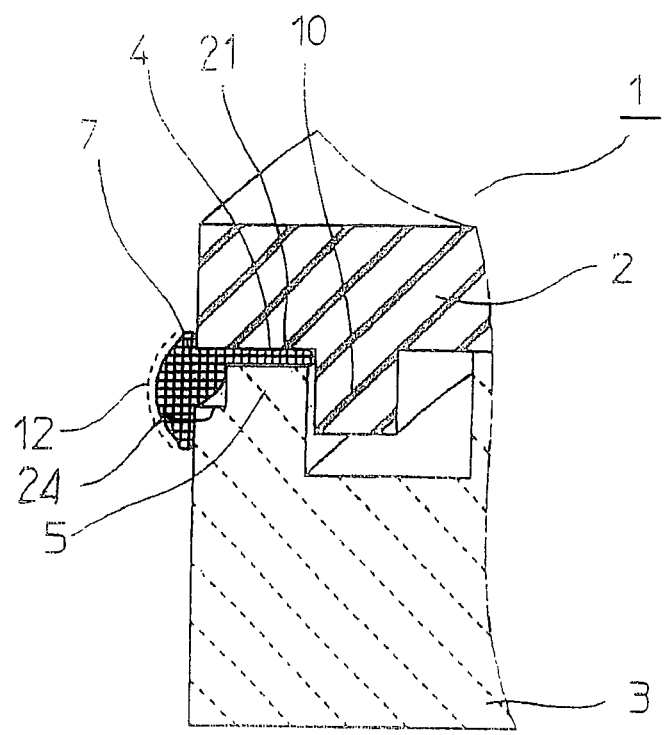
FIG. 5 is a partial cross sectional view showing another example of a welded resin material of the embodiment 2.
Figure 6:
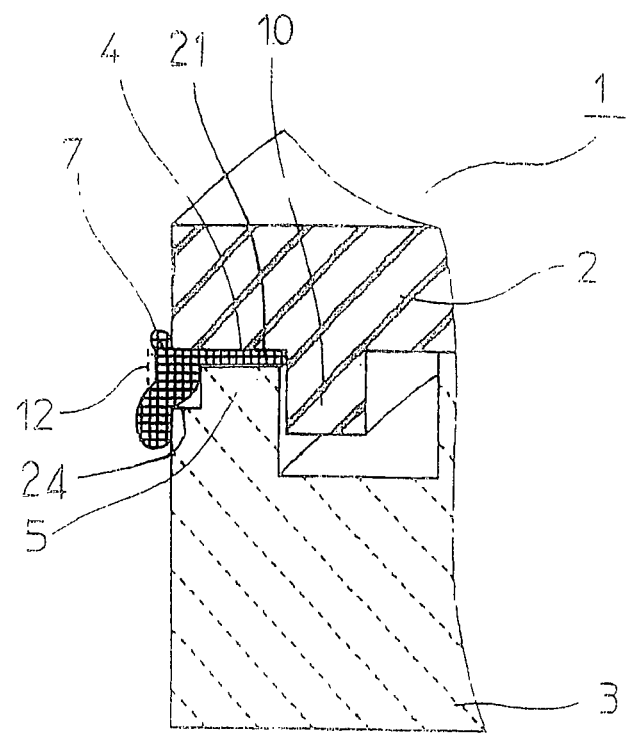
FIG. 6 is a partial cross sectional view showing still another example of a welded resin material of the embodiment 2.

The shape of the molded exposed surface 12 is not particularly specified, and the contour of the cross section may be linear as shown in FIG. 4 or may be curved as shown in FIG. 5. In consideration of the objects of the present invention, it is preferred that the cross section does not have an incisive shape. Only a part of the exposed surface may be molded as shown in FIG. 6. Even in the case where only a part of the exposed surface is molded, the excluded molten resin can be suppressed from growing in an incisive brush form.

The method for producing the sealed container 1 shown in FIGS. 4 to 6 will be described through the process steps. FIG. 7 is a partial cross sectional view showing an example of a method for producing a welded resin material of the embodiment 2. In the first step, the lid body 2 formed of a resin having transmissibility to laser light and the chassis 3 formed of a resin having absorptivity to laser light are superimposed and assembled at a prescribed position to make the lid body 2 and the second annular projection 5 of the chassis 3 in contact with each other, which form the contact part 21. In the second step, a load F is applied to the assembly by using a pressing jig (which is not shown in the figure) to make the contact part 21 of the lid body 2 and the chassis 3 in a contact state under pressure.

The second step may be omitted in the case where the load F can be substituted by the weight of the lid body 2. The structure of the pressing jig is not particularly specified as far as a pressing force is applied to the contact part 21, and is necessarily constituted to prevent the light path of the laser beam LB from being hindered. In the case where a part of the pressing jig has a structure hindering the light path, a material that is transparent to the laser light, such as glass, may be used as the part of the pressing jig. At this time, simultaneously, a mold A1 is assembled onto the excluding path of the resin 7 excluded upon welding. In the third step, the contact part 21 is irradiated with the laser beam LB from the side of the lid body 2.

The laser light source used herein is preferably a semiconductor laser or a YAG laser as described for the embodiment 1. The radiation method of the laser beam may be selected from various methods as described for the embodiment 1, such as a method of scanning the contact part 21 with a laser beam focused to a spot form, and a method of irradiating the contact part 21 at one time with a laser beam having been shaped with an optical device or a mask according to the contact part 21.

As a result of radiation of the laser beam LB onto the contact part 21, a molten layer is formed in the contact part 21. A part of the molten resin is excluded outside the rib (second annular projection) 5 owing to the pressing force applied to the contact part 21. The excluded resin 7 is blocked within a closed space 14 formed among the mold surface A2 of the mold A1, the lid body 2 and the chassis 3, and the excluded resin 7 is thus molded along the outline of the mold and then solidified, during which the molten layer in the contact part 21 is also solidified to attain welding.

The excluded molten resin is molded into a prescribed shape that is not incisive, whereby the risk of dropping off due to vibration or impact can be reduced. The volume of the closed space 14 is preferably set to a value around the volume of the excluded resin 7. In the case where the volume of the closed space 14 is too larger than the volume of the excluded resin 7, the excluded resin 7 can freely grow within the closed space 14 to impair the effect of suppressing growth to an incisive shape. In the case where the volume of the closed space 14 is too smaller than the volume of the excluded resin 7, the excluded resin 7 invades into a minute gap between the mold A1 and the lid body 2 or the chassis 3 to form an incisive shape.

A heating member is provided in the mold A1 to maintain the mold to a temperature higher than an ordinary temperature, whereby the excluded resin 7 is liable to be molded into a shape along the mold surface A2, as compared to the case where the mold A1 is at an ordinary temperature. This effect can be enhanced by increasing the temperature of the mold A1, but the temperature preferably does not exceed the melting point of the resin material. In the case where the temperature of the mold A1 exceeds the melting point of the resin material, the excluded resin 7 is firmly adhered to the mold A1 to make release therefrom difficult. Furthermore, there is such a possibility that the lid body 2 and the chassis 3 adjacent to the mold A1 are heated through heat transfer to cause thermal deformation.

Figure 8:
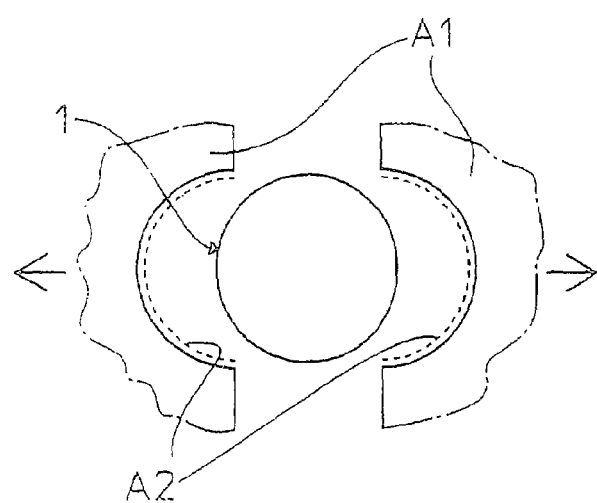
FIG. 8 is an illustrative view showing a state where a mold is released in the embodiment 2, viewed from an upper surface of a lid body.

In the embodiment 2, the mold A1 is placed at a prescribed position before radiation of the laser beam LB, but the mold A1 may be placed after completing radiation of the laser beam LB, followed by molding. Finally, as the fourth step, the mold A1 is released after completing solidification of the excluded resin 7. The mold A1 is divided into two pieces upon releasing. FIG. 8 is an illustrative view showing the state where the mold A1 is released, viewed from the upper surface of the lid body 2, in which the mold A1 is divided in such a manner that the mold surface A2 is divided into two pieces. Even in the case where the excluded resin 7 is adhered to the mold A1, the mold can be released relatively easily since the mold A1 is released by dividing. The method of dividing the mold is not limited to dividing into two pieces, and the mold may be divided into three or more pieces. The mold may be released without dividing in the case where adhesion property between the materials of the excluded resin 7 and the mold A1 is low.

While the presently preferred embodiments of the present invention have been shown and described. It is to be understood that these disclosures are for the purpose of illustration and that various changes and modifications may be made without departing from the scope of the invention as set forth in the appended claims.

What is claimed is:

1. A welded resin material comprising a resin member having transmissibility to laser light, a resin member having absorptivity to laser light, a joined part comprising a contact part of the resin members superimposed to each other that has been welded with laser light, and a closed space that is adjacent to the contact part and faces one end of the contact part, the closed space having housed therein a resin excluded from the contact part melted and solidified;

wherein the contact part of the resin members is formed by making an annular projection of one of the resin members in contact with the other of the resin members, and the other of the resin members has an annular projection that extends from the other resin member toward the one resin member, overlaps a peripheral surface of the annular projection of the one resin member, is interdigitated with the annular projection of the one of the resin members on a side of the contact part opposite to the closed space, and prevents the melted resin from being excluded to a side of the contact part opposite to the closed space.

2. The welded resin material as claimed in claim 1, wherein the annular projection of the other resin member is radially inwardly relative to the annular projection of the one resin member.

3. The welded resin material as claimed in claim 1, wherein the annular projection of the other resin member is radially outwardly relative to the annular projection of the one resin member.

* * * * *